US008095677B1

(12) United States Patent  
Kucherawy

(10) Patent No.: US 8,095,677 B1  
(45) Date of Patent: Jan. 10, 2012

(54) CONFIGURATION RULE GENERATION WITH COMPRESSED ADDRESS SETS

(75) Inventor: Murray S. Kucherawy, San Francisco, CA (US)

(73) Assignee: Sendmail, Inc., Emeryville, CA (US)

( * ) Notice: Subject to any disclaimer, the term of this patent is extended or adjusted under 35 U.S.C. 154(b) by 253 days.

(21) Appl. No.: 12/470,436

(22) Filed: May 21, 2009

(51) Int. Cl.
*G06F 15/16* (2006.01)
*G06F 15/173* (2006.01)
*G06F 15/177* (2006.01)

(52) U.S. Cl. ........ 709/230; 370/256; 370/254; 370/253; 370/351

(58) Field of Classification Search .......... 709/217–230; 370/256, 254, 253, 251
See application file for complete search history.

(56) References Cited

U.S. PATENT DOCUMENTS

| 6,665,274 | B1 * | 12/2003 | Yamada ........................ 370/256 |
| 7,752,301 | B1 * | 7/2010 | Maiocco et al. .............. 709/224 |
| 7,864,776 | B2 * | 1/2011 | Laamanen et al. ........ 370/395.31 |
| 2005/0106941 | A1 * | 5/2005 | Witchey ......................... 439/620 |
| 2006/0200659 | A1 * | 9/2006 | Gillum ........................... 713/151 |
| 2007/0008949 | A1 * | 1/2007 | Balandin ........................ 370/351 |
| 2007/0124496 | A1 * | 5/2007 | Laamanen et al. ............ 709/238 |
| 2008/0072035 | A1 * | 3/2008 | Johnson et al. ............... 713/153 |
| 2009/0141651 | A1 * | 6/2009 | White et al. ................... 370/254 |
| 2009/0216895 | A1 * | 8/2009 | Witchey ......................... 709/230 |
| 2009/0262659 | A1 * | 10/2009 | Sturges et al. ................. 370/253 |
| 2010/0229096 | A1 * | 9/2010 | Maiocco et al. .............. 715/734 |

\* cited by examiner

*Primary Examiner* — Haresh N Patel

(74) *Attorney, Agent, or Firm* — Kilpatrick Townsend & Stockton LLP

(57) ABSTRACT

Techniques for compressing a set of input addresses to generate a set of one or more rules for various network applications and tools such as routers, firewalls, and others. A tree is generated based upon a set of input addresses. A set of one or more rules may be generated based upon the generated tree and a tolerance value. The set of one or more rules may identify one or more address segments that include the input addresses and may also include one or more additional addresses. In one embodiment, the set of one or more rules may be one or more Classless Internet Domain Routing (CIDR) expressions. The set of one or more rules may be provided to various network applications and tools for further processing.

21 Claims, 9 Drawing Sheets

CONFIGURATION RULE GENERATION WITH COMPRESSED ADDRESS SETS

FIELD OF THE INVENTION

The present invention relates to communications in general and in particular to techniques for compressing a list of network addresses to generate a set of one or more rules for various network applications and tools such as routers, firewalls, network monitoring tools, and others.

BACKGROUND OF THE INVENTION

IP Addressing

Two network addressing schemes are currently deployed on the Internet. Internet Protocol version 4 ("IPv4") is by far the most widely deployed Internet protocol (the other addressing scheme is "IPv6"). An IPv4 address (hereinafter referred to as an "IP address") is a 32-bit integer, expressed as four 8-bit integers separated by period or "dot" characters. This is also known as "dotted-quad notation". An example IP address in dotted-quad notation is 192.168.0.1. An IP address expressed in a dotted-quad notation may be translated to a binary representation for use within computers. For example, the integer 192 may be expressed in binary as 11000000, 168 as 10101000, 0 as 00000000, and 1 as 00000001. Thus, this translation is isomorphic with exactly one dotted-quad expression for each binary expression. While embodiments of the invention are described herein with respect to IPv4, the described embodiments may similarly process IPv6 addresses (128 bits) with little or no change to the described embodiments, as will be well understood by those of skill in the art after reading this disclosure.

Routing traffic on the Internet may involve determining the next "hop" (device) on the Internet to which a packet should be sent by inspecting the IP address of a packet. An IP address of a packet may be separated into a "network" segment and a "host" segment. For example, there is a prefix portion of an IP address that is considered to identify a specific network, while the remainder of the IP address identifies a host within that network. Therefore, when a device attempts to contact some other device on a different network, instead of keeping an entire list of IP addresses, the sending device only needs to keep a list of addresses identifying the networks it knows how to reach as well as a default address for handling all unknown destinations, and then sends the packet on its way. This reduces the size of the routing table that is used for routing packets within the Internet. As such, end-nodes on the Internet only need to know their own network prefix, and a "default" route to which traffic may be sent.

Originally, the network prefixing scheme was implicit depending on the first octet of an IP address. For certain values of the first octet, the network prefix was assumed to be 8 bits, meaning 24 bits would remain for the host; for another range of values of the first octet, the division was at 16 bits; for the remainder, the division was at 24 bits. These were known as Class A, Class B and Class C networks, respectively. However, this network prefixing scheme is too limiting. For example, a Class C network includes 256 addresses that is too small for many businesses, while a Class B network includes 65,536 addresses leading to address space waste.

In 1993, the Internet Engineering Task Force (IETF) proposed a new method of network prefixing allowing the partitioning to happen anywhere in an IP address. This is known as CIDR ("Classless Internet Domain Routing"). Using CIDR, the network prefix may be expressed in two different manners: (1) a first IP address followed by a second IP address, separated by a slash ("/") character, e.g., 192.168.0.0/255.255.0.0; (2) an IP address followed by an integer from 1 to 31, separated by a slash ("/") character, e.g., 192.168.0.0/16. In both cases, the data after the slash character indicates the number of bits in an IP address that define the network prefix. In the former case, the binary expression of the second IP address has bits "on" (or 1) if they are network bits, and "off" (or 0) if they are host bits. In the latter case, the integer specifies the number of bits that comprise the network prefix. For example: 192.168.0.0/255.255.0.0 and 192.168.0.0/16 both identify the same network that has a network prefix of 16 bits.

Using CIDR, smaller (or larger) blocks of IP addresses may be allocated to various networks or sub-networks as desired by placing the partition point anywhere in an IP address space that has been already assigned. For example, if a corporation is assigned a network that has a network prefix of 24 bits (and thus 8 host bits) such as 10.231.13.0/24, one or more sub-networks such as 10.231.13.0/25 and 10.231.13.128/25 may be created within the original network. An external entity that attempts to route a packet destined for a particular host in the organization may only need to route the packet to an initial router configured for that organization, and that router knows how to route the packet among the internal sub-networks.

Compressing a list of IP addresses to a relatively smaller list of CIDR expressions may involve identifying one or more common bits within the list of IP addresses and extrapolating one or more CIDR expressions that cover all members of the list of IP addresses. For example, consider a set of 256 IP addresses from 192.168.0.0 through 192.168.0.255. This entire list of IP addresses may be expressed using a single CIDR notation "192.168.0.0/24" as the first 24 bits of all of those IP addresses are identical. Such CIDR expressions may also include one or more additional IP addresses that are not members of the list of IP addresses. This extra "coverage" or "over-coverage" may be acceptable if it is determined that the extra hosts (addresses) covered by the one or more CIDR expressions may become hostile or the punishment of such additional hosts may be acceptable collateral for an organization to defend itself.

Binary Tree

In computer programming, a "tree" is a data structure comprising a set of objects called "nodes" that are linked in a tree-like pattern. Nodes may have arbitrary data stored within them. A tree may include a "root" indicating a starting point for the tree and one or more other nodes. Each node of a tree may have one or more other nodes associated with it as either "parents", "siblings" or "children". The "root" node of a tree has no parent, and a "leaf" node of a tree has no children. Two nodes of a tree with the same parent are considered to be siblings. A connection between a parent node and its children nodes is called a "branch" or a "link". A tree with no more than two children per node is called a "binary" tree. In a binary tree, the children (if they are exist) of a node may be referred to as "left" and "right" of that node. Following a link from a node to one of its children is called "descending".

Trees may be used for data sorting. For example, a well-known technique called "depth-first search" may be used to sort a list of words by generating a tree using the list of words. This may be done in the following manner:

Staring with the first word in the set of words, create a root node and store that first word in the root node;

For each subsequent word to be inserted into the tree, start at the root node, and compare the word to be inserted with the word currently in the node.

If the word to be inserted is lexically (i.e., in dictionary order) before the word currently in the node and there is no "left" child for the node, create a left child of the current node and insert the word there. Otherwise, if the word being inserted is lexically before the word in the node and there is a left child for the node, descend to the left and repeat the test until the appropriate insertion point is determined.

If the word being inserted is lexically after the word in the node and there is no right child for the node, create a right child of the current node and insert the word there. Otherwise, if the word being inserted is lexically after the word in the node and there is no right child, descend to the right and repeat the test until the appropriate insertion point is found.

Upon completion of all the insertions for all the words in the list, a binary tree is generated with the leaf nodes in left-to-right order containing a sorted list of the original words.

Since an IP address is a unique sequence of ones and zeros, the IP address may be represented as a unique sequence of "left" and "right" descents in a binary tree.

Related Problems

A firewall is a piece of software or hardware deployed at an organization to protect the organization from external attacks. A firewall may analyze each incoming packet and make "allow" or "deny" decisions based upon one or more user-configurable rules. The one or more user-configurable rules may be based upon one or more IP addresses that appear to be participating in an attack. For example, a rule may be configured that causes the firewall to block all traffic originated from a particular IP address that appears to be participating in an attack. However, the number of user-configurable rules that the firewall needs to compare for each incoming packet may impact the performance of the firewall. The more rules are added to the firewall configuration, the slower the firewall performance would be as each rule is consulted for every arriving packet. An attack involving a large number of IP addresses may cause a large number of rules to be added to the configuration, which in turn causes a large number of rules to be applied for each incoming packet, thereby slowing down the firewall's performance.

An optimization of the above problem and similar problems for various network applications and tools (e.g., routers, firewalls, network monitoring tools, and others) is desirable.

BRIEF SUMMARY OF THE INVENTION

The following detailed description together with the accompanying drawings will provide a better understanding of the nature and advantages of the present invention.

Embodiments of the present invention provide techniques for compressing a set of input addresses to generate a set of one or more rules for various network applications and tools. A tree may be generated based upon a set of input addresses. In one embodiment, the set of input addresses may be a set of IP addresses. A set of one or more rules may be generated based upon the generated tree and a tolerance value. The set of one or more rules may identify one or more address segments that include the input addresses and zero or more additional addresses. In one embodiment, the set of one or more rules may be one or more Classless Internet Domain Routing (CIDR) expressions.

According to one embodiment of the present invention, a computer-implemented method for compressing a set of input addresses to generate one or more rules includes receiving, at a processing system, a plurality of input addresses; and generating, at the processing system, a tree using the plurality of input addresses. The method further includes generating, at the processing system, based upon the tree and a tolerance value, one or more rules, wherein the one or more rules include the plurality of input addresses and zero or more additional addresses. The plurality of input addresses may be an Internet address where the Internet address is 32 bits for IPv4 and 128 bits for IPv6.

According to a specific embodiment, the step of generating the tree includes generating a binary tree where the binary tree includes a plurality of leaf nodes with each leaf node corresponding to one of the input addresses. The leaf nodes taken from left-to-right order include a sorted list of the input addresses.

According to another specific embodiment, the set of one or more rules includes one or more Classless Internet Domain Routing (CIDR) expressions. The set of one or more rules may identify one or more address segments where the one or more address segments include the input addresses and zero or more additional addresses.

According to another specific embodiment, the tolerance value is a percentage value representing a percentage of additional addresses that can be included in the set of one or more rules. The tolerance value may be user configurable. The number of the one or more rules produced is less than or equal to the number of the input addresses.

According to another embodiment of the invention, a computer-readable storage medium is provided for storing a plurality of instructions for compressing a set of input addresses to generate one or more rules. The plurality of instructions include instructions that cause the processor to receive a plurality of input addresses; instructions that cause the processor to generate a tree using the plurality of input addresses; and instructions that cause the processor to generate, based upon the generated tree and a tolerance value, one or more rules. The one or more rules include the plurality of input addresses and zero or more additional addresses. Each of the input addresses of the plurality is a 32-bit long Internet address for IPv4 or a 128-bit long Internet address for IPv6.

According to a specific embodiment, the instructions that cause the processor to generate the tree include instructions that cause the processor to generate a binary tree where the binary tree includes a plurality of leaf nodes and a plurality of intermediate nodes with each leaf node corresponding to one of the input addresses. The leaf nodes taken from left-to-right order may include a sorted list of the input addresses.

According to a specific embodiment, the set of one or more rules includes one or more Classless Internet Domain Routing (CIDR) expressions. The set of one or more rules may identify one or more address segments where the one or more address segments include the input addresses and zero or more additional address.

According to a specific embodiment, the tolerance value is a percentage value representing a percentage of additional addresses that can be included in the set of one or more rules. The tolerance value may be user configurable. The number of the one or more rules produced is less than or equal to the number of the input addresses.

According to another embodiment, a system is provided for compressing a set of input addresses to generate one or more rules. The system includes a memory configured to store a plurality of input addresses; and a processor coupled to the memory. The processor is configured to: receive a plurality of input addresses; generate a tree using the plurality of input addresses; and generate, based upon the tree and a tolerance value, one or more rules. The one or more rules include the plurality of input addresses and zero or more additional addresses. Further, the set of one or more rules may identify one or more address segments, wherein the one or more address segments include the input addresses and zero or more additional addresses.

The foregoing, together with other features and embodiments will become more apparent when referring to the following specification, claims, and accompanying drawings.

DETAILED DESCRIPTION OF SELECT EMBODIMENTS

In the following description, for the purposes of explanation, specific details are set forth in order to provide a thorough understanding of embodiments of the invention. However, it will be apparent that the invention may be practiced without these specific details.

Embodiments of the present invention provide techniques for compressing a set of input addresses to generate a set of one or more rules for various network applications and tools. A tree may be generated based upon a set of input addresses. In one embodiment, the set of input addresses may be a set of IP addresses. A set of one or more rules may be generated based upon the generated tree and a tolerance value. The set of one or more rules may identify one or more address segments that include the input addresses and zero or more additional addresses. In one embodiment, the set of one or more rules may be one or more Classless Internet Domain Routing (CIDR) expressions.

Figure 1:
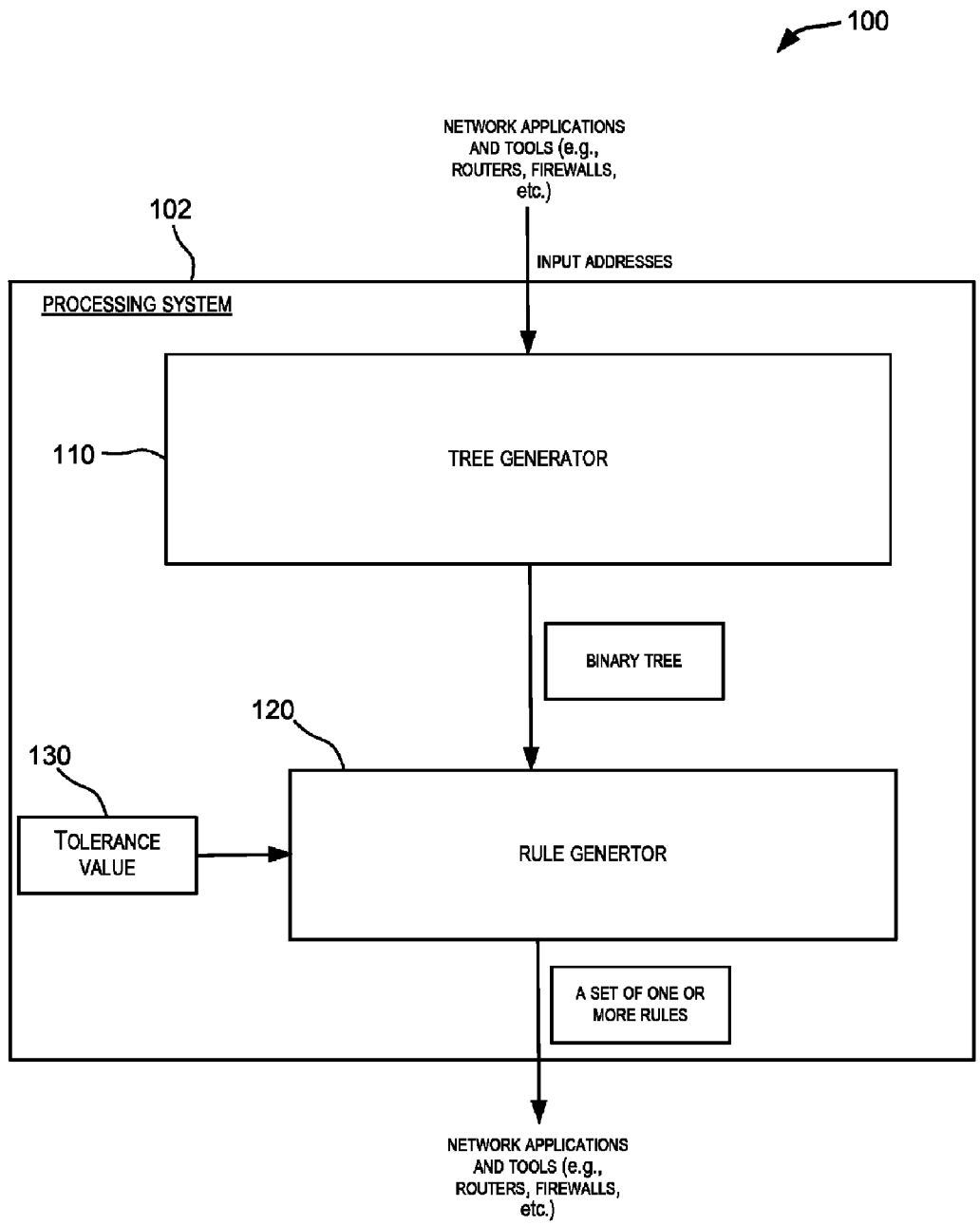
FIG. 1 is a simplified block diagram of a system for compressing a set of input addresses to generate a set of one or more rules according to an embodiment of the present invention.

FIG. 1 is a simplified block diagram of a system 100 for compressing a set of addresses to generate a set of one or more rules according to an embodiment of the present invention. As depicted in FIG. 1, system 100 comprises a processing system 102 that is configured to compress a set of input addresses received by the processing system, and to generate a set of one or more rules based upon the set of input addresses. The set of input addresses received by processing system 102 may be IP-v4 addresses, while the set of one or more rules generated by processing system 102 may be one or more Classless Internet Domain Routing (CIDR) expressions identifying one or more Internet address segments that include the set of input addresses and zero or more additional addresses. For example, assume there are four IPv4 addresses (e.g., 192, 168.0.1, 192,168.0.0, 192,168.0.3, and 192.168.0.7) received by processing system 102, processing system 102 may compress these four input addresses to generate two CIDR expressions (e.g., 192.168.0.0/30 and 192.168.0.7/32). The two CIDR expressions identify two Internet addresses segments that include the four input IP addresses and an additional IP address. For example, CIDR expression 192.168.0.0/30 identifies a first Internet address segment that includes IP addresses 192.168.0.0, 192.168.0.1, 192,168.0.2, and 192,168.0.3, while CIDR expression 192.168.0.7/32 identifies a second Internet address segment that includes IP address 192.168.0.7. In this manner, processing system 102 is able to compress a large list of input addresses into a smaller list of one or more rules (the above example illustrates that four input addresses were compressed to generate two rules, which is a 50% reduction), thereby reducing the number of rules to be added to the network configuration (e.g., firewalls). Such a reduction may improve the overall network performance. The number of rules that may be generated by processing system 102 may depend on a tolerance value configured for processing system 102, as will be described in more detail later.

In the embodiment depicted in FIG. 1, processing system 102 comprises one or more modules that facilitate address compression to generate one or more rules for network applications and tools (e.g., firewalls, routers, and others). In one embodiment, processing system 102 may include a tree generator 110 and a rule generator 120. The various modules included in processing system 102 may be implemented in software (e.g., code, instructions, program) executed by a processor of processing system 102, hardware, or combinations thereof. It should be apparent that the modules depicted in FIG. 1 are not intended to limit the scope of the present invention, as recited in the claims. In alternative embodiments, processing system 102 may have more or fewer modules than the ones depicted in FIG. 1.

In one embodiment, a set of input addresses may be received by processing system 102. The input addresses may be received at processing system 102 from various network applications and tools such as routers, firewalls, network monitoring tools, and others. Alternatively, the input addresses may be provided by a user (e.g., a network administrator) directly via a user interface (not shown in FIG. 1). In one embodiment, the input addresses received by processing system 102 are IP-v4 addresses. As explained above, an IP-v4 address (hereinafter referred to as an "IP address") is a 32-bit integer, expressed as four 8-bit integers known as "dotted-quad notation". An example IP address in dotted-quad notation is 192.168.0.1. An IP address expressed in a dotted-quad notation may be translated to a binary expression. For example, 192.168.0.1 may be expressed in binary form as 11000000101010000000000000000001.

For purposes of simplifying the following description, it is assumed that the input addresses that are received by processing system 102 are IP-v4 addresses. However, this is not intended to limit the scope of the present invention. For example, processing system 102 may be configured to support other types of addressing schemes such as IPv6 addresses. The extension of processing system 102 to support other types of addressing schemes is not discussed in detail in the present disclosure but should be trivial to those skilled in the art after reading this disclosure.

In one embodiment of the present invention, the input addresses received by processing system 102 may be used to generate a tree. In one embodiment, tree generator 110 is provided that is configured to generate a binary tree using the input addresses received at processing system 102.

Figure 2:
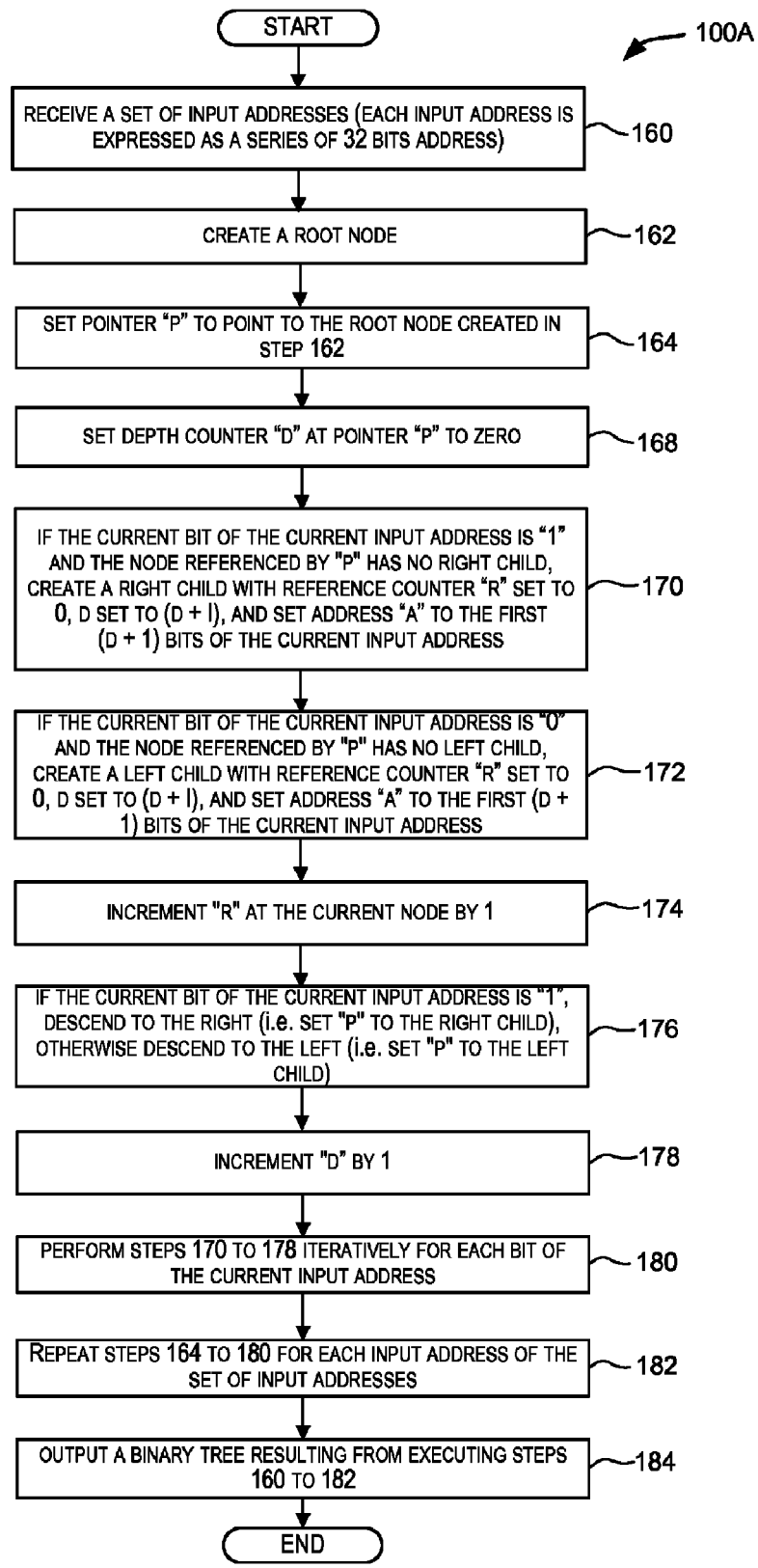
FIG. 2 is a simplified flowchart depicting a process for generating a binary tree according to an embodiment of the present invention.

FIG. 2 is a simplified flowchart depicting a method 100A that may be implemented by tree generator 110 for generating a binary tree according to an embodiment of the present invention. The method depicted in FIG. 2 may be performed by software (e.g., code, program, instructions) executed by a processor, in hardware, or combinations thereof. The method depicted in FIG. 2 is not intended to limit the scope of the invention as recited in the claims.

Referring to FIG. 2, a set of input addresses received by processing system 102 are provided to method 100A (step 160). In one embodiment, each input address using as an input by method 100A is expressed as a 32-bit long IPv4 address. A root node is then created (step 162). In one embodiment, the root node created in step 162 may not associate with any values. For each input address, steps 164 to 180 of method 100A are performed as described below.

Set pointer "P" to point to the root node created in step 162 (step 164);

Set depth counter "D" at P to 0 (step 168);

For each bit in the current input address, steps 170 to 178 are performed for each bit in sequence, as described below:

If the current bit is a 1 and the node referenced by "P" has no right child, create a right child with the following associated values: set reference counter "R" to 0, increment the depth counter D (e.g., set depth counter "D" to (D+1)), and set address "A" to the first (D+1) bits of the current input address (step 170);

If the current bit is a 0 and the node referenced by "P" has no left child, create a left child with the following associated values: set reference counter "R" to 0, increment the depth counter D (e.g., set depth counter "D" to (D+1)), and set address "A" to the first (D+1) bits of the current input address (step 172);

Increment reference counter "R" at the current node by 1 (step 174);

If the current bit is a 1, descend to the right (i.e. set "P" to the right child), otherwise descend to the left (i.e. set "P" to the left child) (step 176);

Increment depth counter "D" at the node referenced by "P" by 1 (step 178).

Method (step 184) 100A outputs a binary tree of depth 33 (a root node layer and 32 additional layers with each layer corresponding to a bit in the IP addresses) as a result of executing steps 160 to 182. The binary tree output in step 184 may include one or more leaf nodes. In one embodiment, the number of leaf nodes in the binary tree is equal to the number of unique input addresses used by method 100A. Each leaf node in the binary tree may have one or more associated values such as a reference counter value "R", a depth counter value "D", and a 32-bit address "A". These leaf nodes taken from left-to-right order may include a sorted list of the input addresses used by method 100A. Accordingly, a binary tree may be generated and output by tree generator 110 using method 100A and a set of input addresses received by processing system 102. An example operation of method 100A is described later.

Returning to FIG. 1, the binary tree generated and output by tree generator 110 may be provided to rule generator 120. In one embodiment, rule generator 120 is configured to generate and output a set of one or more rules based upon the binary tree provided by tree generator 110 and a tolerance value 130. In one embodiment, the set of one or more rules generated by rule generator 120 may identify one or more address segments that include the set of input addresses received by processing system 102 and zero or more additional addresses (i.e., zero or more additional addresses that are not included in the set of input addresses). For example, the set of one or more rules may be one or more CIDR expressions identifying one or more Internet address segments that include the set of input addresses received by processing system 102 and zero or more additional addresses. In one embodiment, the number of additional addresses that may be included in the set of rules generated by tree generator 120 may be determined by tolerance value 130. For a given tolerance value 130, rule generator 120 may generate and output a set of one or more rules only if these rules include a number of zero or more additional addresses that is no more than the given tolerance value. For example, tree generator 120 may not generate and output a CIDR expression if the CIDR expression includes more additional addresses than are actually allowed by tolerance value 130 (e.g., the percentage of error or over coverage is too high).

In one embodiment, tolerance value 130 may be a percentage value representing a tolerable percentage of over-covered addresses. Alternatively, tolerance value 130 may be a constant representing an allowed number of over-covered addresses. In one embodiment, a minimum and/or maximum tree depth may also be specified for rule generator 120.

Figure 8:
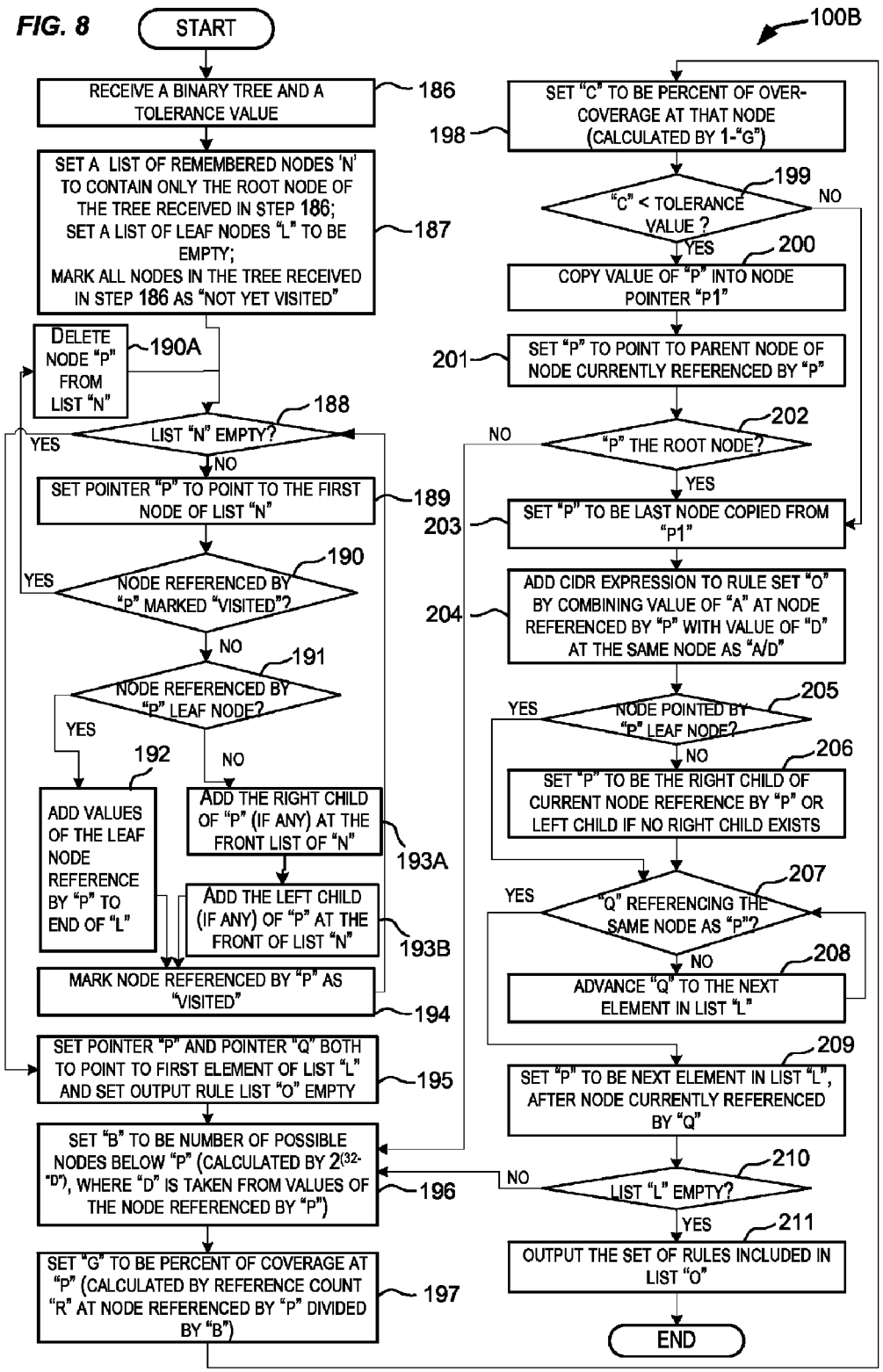
FIG. 8 is a simplified flowchart depicting a method for generating a set of one or more rules according to an embodiment of the present invention.

In one embodiment, rule generator 120 may generate one or more rules. FIG. 8 is a simplified flowchart depicting a method 100B that may be implemented by rule generator 120 for generating a set of one or more rules incorporating an embodiment of the present invention. The method depicted in FIG. 8 may be performed by software (e.g., code, program, instructions) executed by a processor, in hardware, or combinations thereof. The method depicted in FIG. 8 is not intended to limit the scope of the invention as recited in the claims.

Referring to FIG. 8, a binary tree and a tolerance value are used by method 100B (step 186). In one embodiment, the binary tree received at step 186 may be provided by tree generator 110 of FIG. 1. Method 100B includes performing steps 187 through 211 to produce a set of one or more rules using the binary tree and the tolerance value received in step 186, as follows:

1. Set the list of remembered nodes "N" to include only the root node for the tree received in step 186 (step 187);
2. Set the list of leaf nodes "L" to be empty (step 187);
3. Mark all nodes in the tree received in step 186 as "not-yet-visited" (step 187);
4. Determine if "N" becomes empty (step 188);
5. If "N" becomes empty, processing proceeds to step 195;
6. For as long as "N" is not empty, repeat the following steps i through vii:

Set the pointer "P" to reference the first node from the list "N" (step 189);

Determine if the node now referenced by "P" has already been visited by the method (step 190);

If the node referenced by "P" has already been visited, then delete the node referenced by "P" from list "N" (step 190A), and then processing returns to step 188;

Determine if the node now referenced by "P" is a leaf node (step 191);

If the node referenced by "P" is a leaf node, add its associated values (e.g., a reference counter value "R", a depth counter value "D", and a 32-bit address "A") to the end of "L" (step 192);

If the node referenced by "P" has a right child, place the right child of the node referenced by "P" at the front of the list "N" (step 193A), and if the node referenced by "P" has a left child, place the left child of the node referenced by "P" at the front of the list "N" (step 193B);

Mark the node referenced by "P" as "visited" (step 194) and repeat step 188;
7. Set pointer "P" to point to the first element of "L" (step 195);
8. Set pointer "Q" to point to the first element of "L" (step 195);
9. Set the output list "O" to be an empty set (step 195);
10. Compute the following values according to steps 196-198:
   i. Set "B" to be the number of possible nodes covered by "P", by computing 2 to the power of (32–"D"), where "D" is taken from the values in the node referenced by "P" (step 196). For example, if "P" is a leaf node (as it will be at the start), then "D" is 32, so "B" is 2 to the power of (32–32), which is 2 to the power 0, which is 1.
   ii. Set "G" to be percent of coverage at that node, which is the value "R" (the reference count) at "P" divided by "B" (step 197);
   iii. Set "C" to be the percent of over-coverage at that node, which is the value 1 minus "G" (step 198);
11. Determine if the value of "C" is less than the tolerance value received in step 186 (step 199);
12. While "C" is less than the pre-configured tolerance value, perform the following steps:
Copy the value of "P" into node pointer "P1" (step 200),
Set "P" to point to the parent node of the node currently referenced by "P" (step 201);
Determine if "P" is now pointing to the root node (step 202);
If "P" points to the root node, processing proceeds to step 203;
If "P" does not point to the root node, repeat steps 196-198 as discussed above;
13. Set "P" to be the last node copied into "P1" (step 203);
14. Add to output rule list "O" a CIDR expression by combining the value of "A" at node "P" with the value of "D" at node "P", as "A/D" (step 204);
15. Determine if "P" is currently referencing a leaf node (step 205);
16. If "P" is not referencing a leaf node, then set "P" to point to the right child of the current node referenced by "P", or if no right child is present at the node referenced by "P", set "P" to reference the left child of the node currently referenced by "P" (step 206);
17. If "P" is currently referencing a leaf node, then proceed to step 207;
18. Determine if "Q" is referencing the same node as "P" (step 207);
19. If "Q" is not referencing the same node as "P", then advance "Q" to the next element in the list "L" and repeat this step;
20. If "Q" is referencing the same node as "P", then proceed to step 209;
21. Set "P" to be the next element in the list "L" after the node currently referenced by "Q" (step 209);
22. Determine if the list "L" is empty (step 210);
22. If the list "L" is not empty, processing returns to step 196 until the list "L" has been completely processed;
23. If the list "L" is empty, processing outputs a set of one or more rules that are included in list "O" (step 211).

The result from executing method 100B is a set of one or more rules included in the list "O". In one embodiment, the set of one or more rules included in the list "O" is a set of one or more CIDR expressions that identify one or more address segments. The one or more address segments may include a set of input addresses received by processing system 102 and zero or more additional addresses. The number of additional addresses that are identified/included by the set of rules may depend on a tolerance value (e.g., tolerance value 130) configured for processing system 102. An example of the execution of method 100B is provided in a later section.

Returning to FIG. 1, the set one or more rules that are generated by rule generator 120 as a result of executing method 100B may then be output and provided to various network applications and tools for further processing. In this manner, processing system 102 is able to compress a large set of input addresses to generate a smaller set of one or more rules, thereby reducing the number of rules to be added to the configuration of network applications or tools (e.g., firewalls, routers, network monitoring tools and devices, and others). Such a reduction improves the network device's performance.

Figure 9:
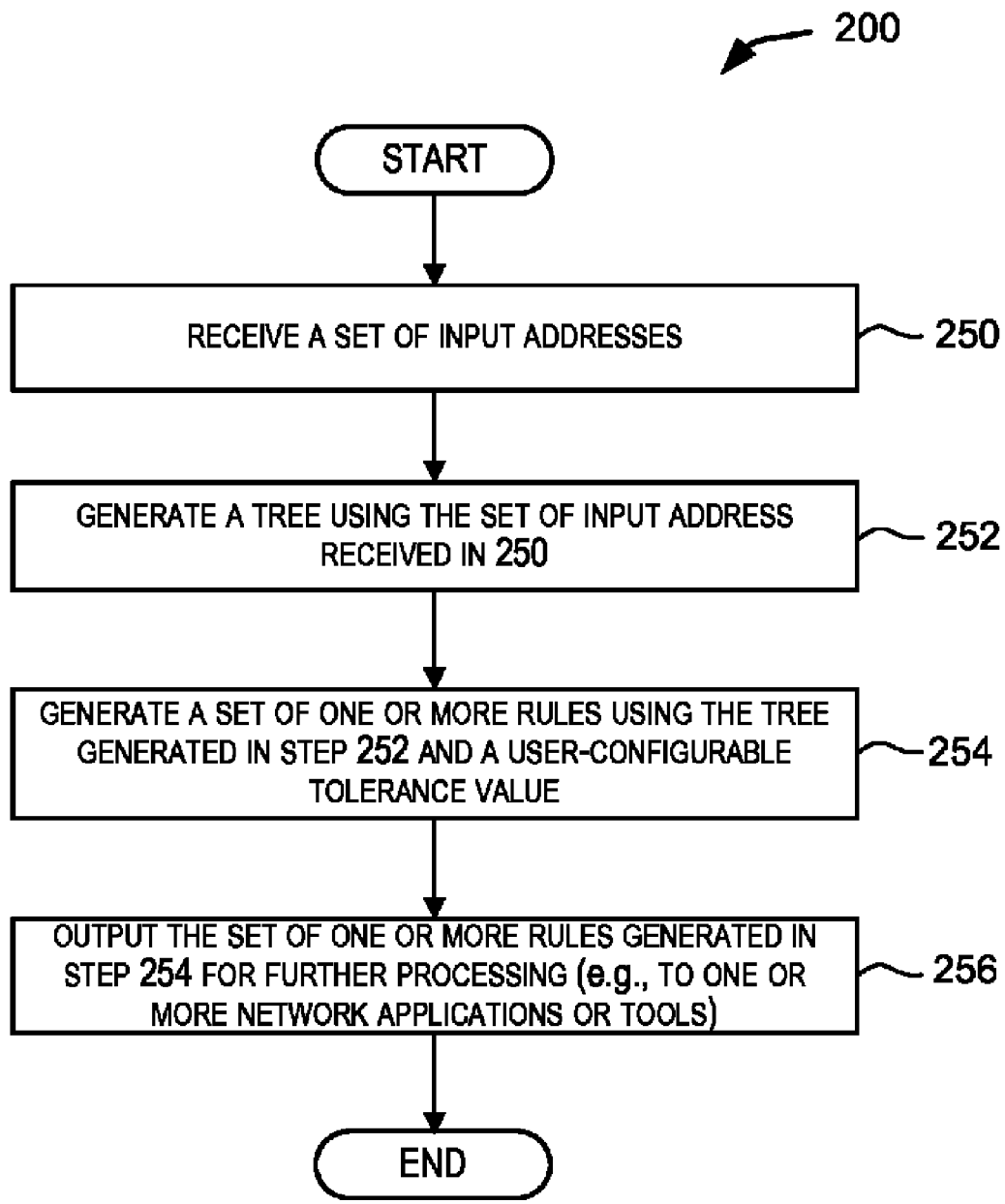
FIG. 9 is a simplified flowchart depicting a method for compressing a set of addresses to generate a set of one or more rules according to an embodiment of the present invention.

FIG. 9 is a simplified flowchart depicting a method 200 for compressing a set of addresses to generate a set of one or more rules according to an embodiment of the present invention. The method depicted in FIG. 9 may be performed by software (e.g., code, program, instructions) executed by a processor, in hardware, or combinations thereof. The method depicted in FIG. 9 is not intended to limit the scope of the invention as recited in the claims.

As depicted in FIG. 9, a set of input addresses is received (step 250). The input addresses may be for example a set of IP addresses. A binary tree may be generated based upon the set of input address received in step 250 (step 252). For example, a binary tree of depth 33 (a root node layer and 32 additional layers with each layer corresponding to a bit in the input IP addresses) may be generated by tree generator 110 from executing method 100A of FIG. 2 based upon the input addresses received in step 250.

In one embodiment, the binary tree generated in step 252 may include one or more leaf nodes. The number of leaf nodes in the binary tree generated in step 252 is equal to the number of unique input addresses received in step 250. Each leaf node in the binary tree generated in step 252 may associate with one or more values such as a reference counter value "R", a depth counter value "D", and a 32-bit address "A". The leaf nodes taken from left-to-right order in the binary tree generated in step 252 may include a sorted list of the input addresses received in step 250.

A set of one or more rules may be generated based upon the binary tree generated in step 252 and a tolerance value (step 254). In one embodiment, the set of one or more rules generated in step 254 may identify one or more address segments that include the set of input addresses received in step 250 and zero or more additional addresses. For example, the set of one or more rules may be one or more CIDR expressions identifying one or more Internet address segments that include the set of input addresses received in step 250 and zero or more additional addresses. The number of additional addresses that may be included in the set of rules generated in step 254 may be determined by a pre-configured tolerance value. For a given tolerance value, a set of one or more rules may be generated only if the number of additional addresses included in the rules is no more than the given tolerance value. For example, a CIDR expression may not be generated if the CIDR expression includes too many additional addresses than are actually allowed by the tolerance value (e.g., the percentage of error or over coverage is too high).

The set of rules generated in step 504 may then be output. In one embodiment, the set of rules generated in step 504 may be provided to various network applications and tools for further processing. In this manner, a set of input addresses may be compressed to generate a smaller set of one or more rules, thereby reducing the number of rules to be added to the configuration of network applications or tools (e.g., firewalls, routers, network monitoring tools and devices, and others). Such a reduction improves the overall network performance.

Example

This section provides an example execution of methods 100A and 100B according to an embodiment of the present invention. This example is not intended to limit the scope of the application as recited in the claims.

Method 100a of FIG. 2 for Generating a Binary Tree

This section provides an example execution of method 100A for generating a binary tree from a set of input addresses according to an embodiment of the present invention. For the example described below, assume that a set of four input addresses: 192.168.0.1, 192.168.0.0, 192.168.0.3, and 192.168.0.7 are used as inputs by method 100A. Given the list of input addresses, method 100A of FIG. 2 may be executed iteratively for each input address as described below.

Figure 3:
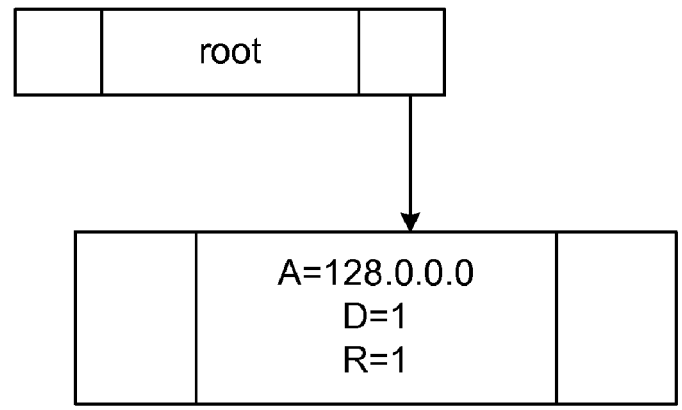
FIG. 3 is a tree diagram.

First, a root node is created for the tree to be generated. Next, starting from the first input address 192.168.0.1, since the first bit of the first input address is a "1", a first node is created as the "right" child of the root node. The first node has one or more associated values such as a depth counter "D", a reference counter "R", and an address "A", which is illustrated in FIG. 3.

Figure 4:
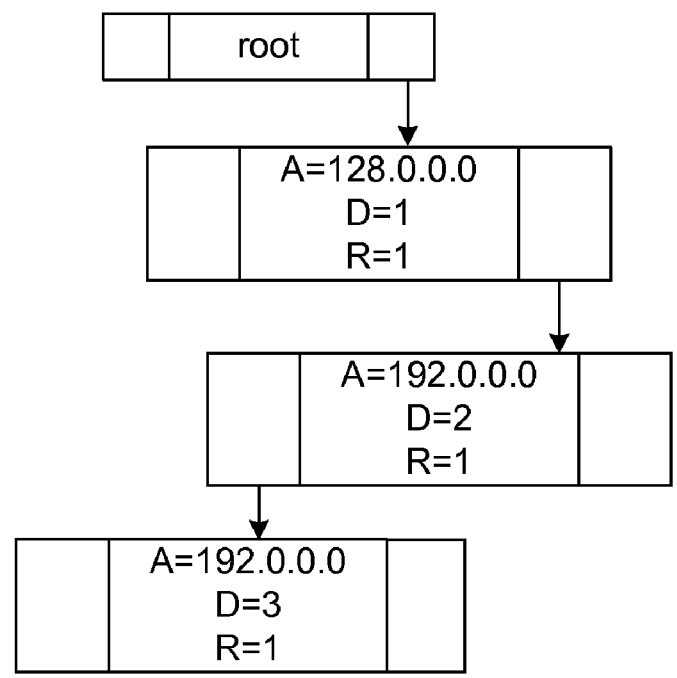
FIG. 4 is a tree diagram.

Subsequently, a second node is added to the right descent of the first node (since the second bit of the first address is also a "1"). A third node is then added to the left descent of the second node (since the third bit of the first input address is a "0"). The resulting partial tree is shown in FIG. 4.

Figure 5:
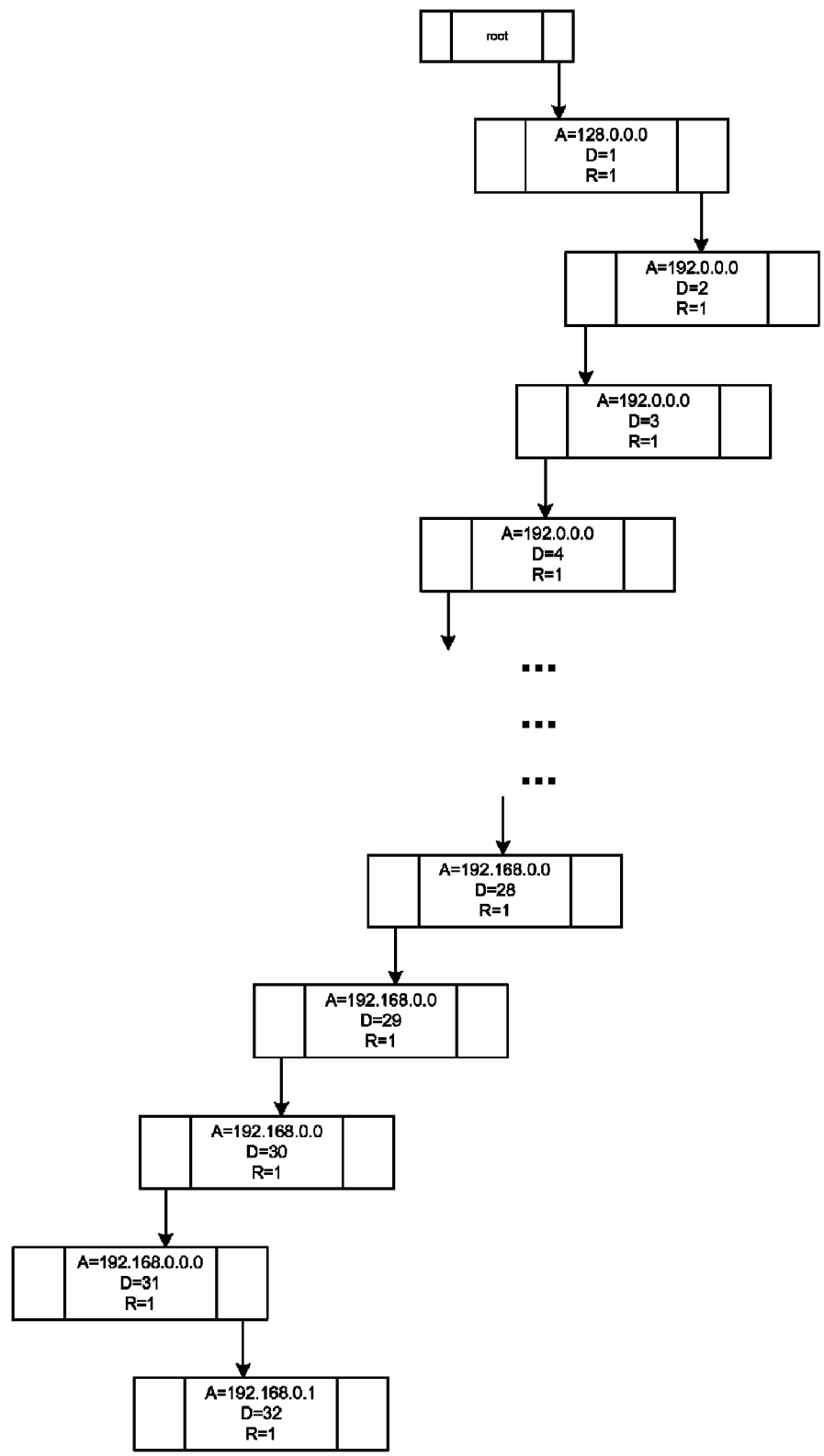
FIG. 5 is a tree diagram.

Method 100A proceeds for each bit of the first input address until it reaches the last bit of the first input address (the last bit is a "1"). This results in a tree as shown in FIG. 5.

Figure 6:
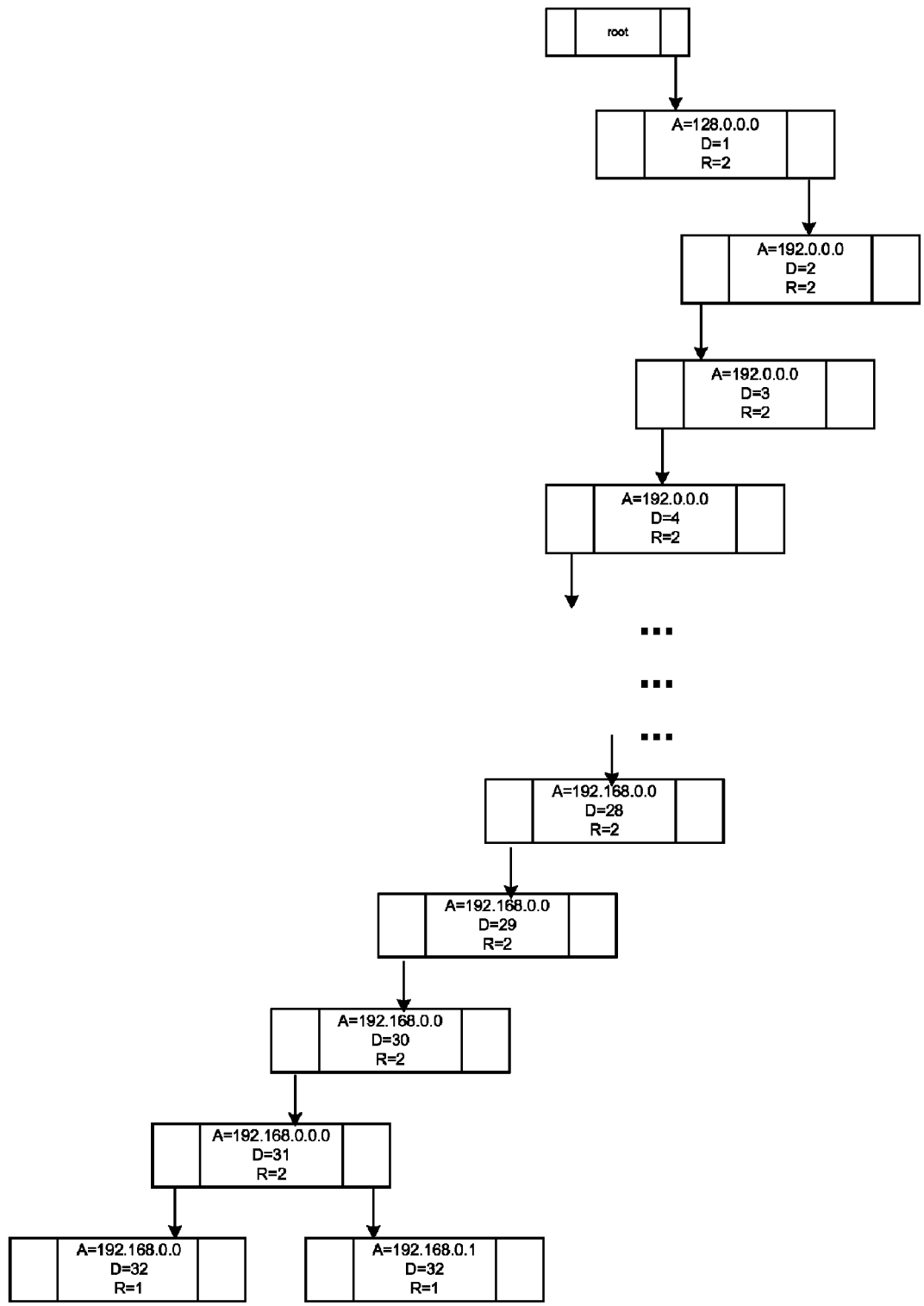
FIG. 6 is a tree diagram.

Processing of method 100A then repeats for the second input address 192.168.0.0. This results in a partial tree as shown in FIG. 6.

Similarly, processing of method 100A repeats for the third and fourth input addresses 192.168.0.3 and 192.168.0.7. This results in a tree as shown in FIG. 7.

Figure 7:
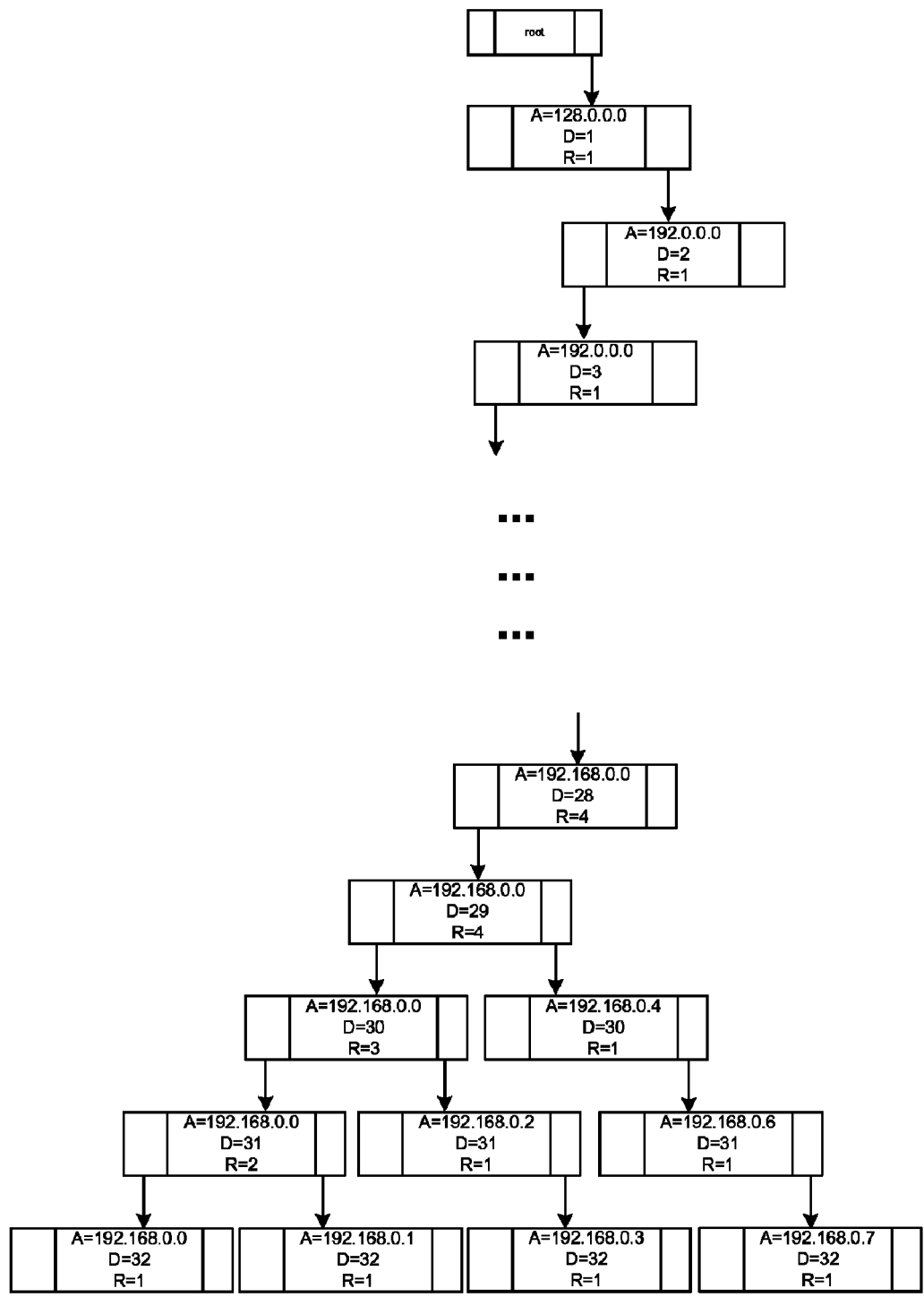
FIG. 7 is a tree diagram.

As shown in FIG. 7, a binary tree of depth 33 is generated as a result of executing method 100A of FIG. 2 for a set of input addresses. The number of leaf nodes in the binary tree as illustrated in FIG. 7 is equal to the number of unique input addresses. Each leaf node in the binary tree includes a set of values such as a reference counter value "R", a depth counter value "D", and a 32-bit address "A" as depicted in FIG. 7. The leaf nodes taken from left-to-right order in the binary tree include a sorted list of the four input addresses.

Method 100b of FIG. 8 for Generating a Set of One or More Rules

This section provides an example execution of method 100B for generating one or more rules according to an embodiment of the present invention. For the example described below, assume that the binary tree as illustrated in FIG. 7 is used as an input for method 100B of FIG. 8.

Given the binary tree as depicted in FIG. 7, method 100B may generate a list "L" including all of the leaf nodes of the binary tree. In this example, the list "L" may include a sorted list of the four input addresses (192.168.0.0, 192.168.0.1, 192.168.0.3, 192.168.0.7) that were used as inputs in method 100A as discussed above. Method 100B then proceeds as follows, assuming that a tolerance value of 30% is used for the computations:

1. First, set both P and Q to the first element of L. The first element of list L has an address "A"=192.168.0.0. Set O to be an empty set.
2. Compute B for this node by considering the value (32−D). D at this node is 32, and 32−32=0, so the value of B is $2^0$, or 1. Thus, this node covers exactly one address.
3. Compute G by dividing R by B. Both R and B are equal to 1, so the value of G is 1/1 which is 1.
4. Compute C by subtracting G from 1. Thus, C=1−1, or C=0. Expressed as a percentage, this is 0% (a value of 1 would be 100%, a value of 0.6 would be 60%, etc.).
5. Note that C is less than the tolerance value 30%.
6. Store in P1 the current value of P, i.e. the first node.
7. Set P to point to the parent of the node to which it currently points, namely the node directly above it.
8. Re-compute B, G and C for that node. These values are: $B=2^{(32-D)}=2^{(32-31)}=2^1=2$; $G=R/B=2/2=1$; $C=1-G=1-1=0=0\%$
9. Note that C is less than the tolerance value 30%.
10. Store in P1 the current value of P.
11. Set P to point to the parent of the node to which it currently points, namely the one right above it.
12. Recompute B, G and C for that node. The values in this case are:
$B=2^{(32-D)}=2^{(32-30)}=2^2=4$
$G=R/B=3/4=0.75$
$C=1-G=1-0.75=0.25=25\%$
13. Note that C is less than the tolerance value 30%.
14. Store in P1 the current value of P.
15. Set P to point to the parent of the node to which it currently points, namely the one right above it.
16. Recompute B, G and C for that node. The values are: $B=2^{(32-D)}=2^{(32-29)}=23=8$; $G=R/B=4/8=0.5$; $C=1-G=1-0.5=0.5=50\%$
17. Note that C is now greater than the tolerance value 30%, which means the method has gone beyond the user-provided tolerance limit.
18. Set P to the current value of P1.
19. Add to list O the CIDR expression represented by the node at which P is pointing. In this case, the produced CIDR expression is 192.168.0.0/30.
20. Descend P to the right until it reaches a leaf node.
21. Advance Q through the list L until Q and P both reference the same node (in this case, the node representing 192.168.0.3).
22. Advance both Q and P to the next node in the list L, in this case the node representing 192.168.0.7.
23. Recompute B, G and C for that node. The values are: $B=2^{(32-D)}=2^{(32-32)}=2^0=1$; $G=R/B=1/1=1$; $C=1-G=1-1=0=0\%$
24. Note that C is less than the tolerance value 30%.
25. Store in P1 the current value of P.
26. Set P to point to the parent of the node to which it currently points, namely the one right above it.
27. Recompute B, G and C for that node. The values are: $B=2^{(32-D)}=2^{(32-31)}=2^1=2$; $G=R/B=1/2=0.5$; $C=1-G=1-0.5=0.5=50\%$
28. Note that C is now greater than the tolerance value 30%.
29. Set P to the current value of P1.
30. Add to the list O the CIDR expression represented by the node at which P is pointing. In this case, the produced CIDR expression is 192.168.0.7/32.
31. Descend P to the right until it reaches a leaf node.
32. Advance Q through the list L until Q and P both reference the same node (in this case, the node representing 192.168.0.7).

33. Note that the list L has no more entries after the current one, so P and Q cannot be advanced further. Method 100B now terminates.

As shown above, given four input addresses and a tolerance value of 30%, method 100B may yield two CIDR expressions 192.168.0.0/30 and 192.168.0.7/32. This represents a 50% reduction in the number of rules to be added to network configurations such as the network configuration for various network applications and tools. The two CIDR expressions that are output by method 100B include all four input addresses and one additional address. Thus, only one additional address is included in the CIDR expressions. Such an over-coverage is within the tolerance value of 30%.

As mentioned above, the number of additional addresses that may be included in the set of output rules (e.g., CIDR expressions) may vary depending on a configurable tolerance value limiting the size of that "overshoot". For example, given a tolerance value of 80%, method 100B may yield a single CIDR expression 192.168.0.0./29. This CIDR expression includes four additional addresses that were not part of the original list of input addresses. Such an "overshoot" may be acceptable because the extra addresses may soon become elements of the list of input addresses or the collateral impact may be tolerable subject to some local policy.

As described above, techniques are provided for compressing a set of input addresses to generate a set of one or more rules for various network applications and tools such as routers, firewalls, and others. A set of one or more rules may be generated based upon the generated tree and a tolerance value. The set of one or more rules may identify one or more address segments that include the input addresses and zero or more additional addresses. In one embodiment, the set of one or more rules may be one or more Classless Internet Domain Routing (CIDR) expressions. The set of one or more rules may be provided to various network applications and tools for further processing. In this manner, a set of input addresses may be compressed to generate a smaller set of one or more rules, thereby reducing the number of rules to be added to network configurations for various network applications and tools (e.g., firewalls, routers, network monitoring tools and devices, and others). Such a reduction improves the overall network performance.

Figure 10:
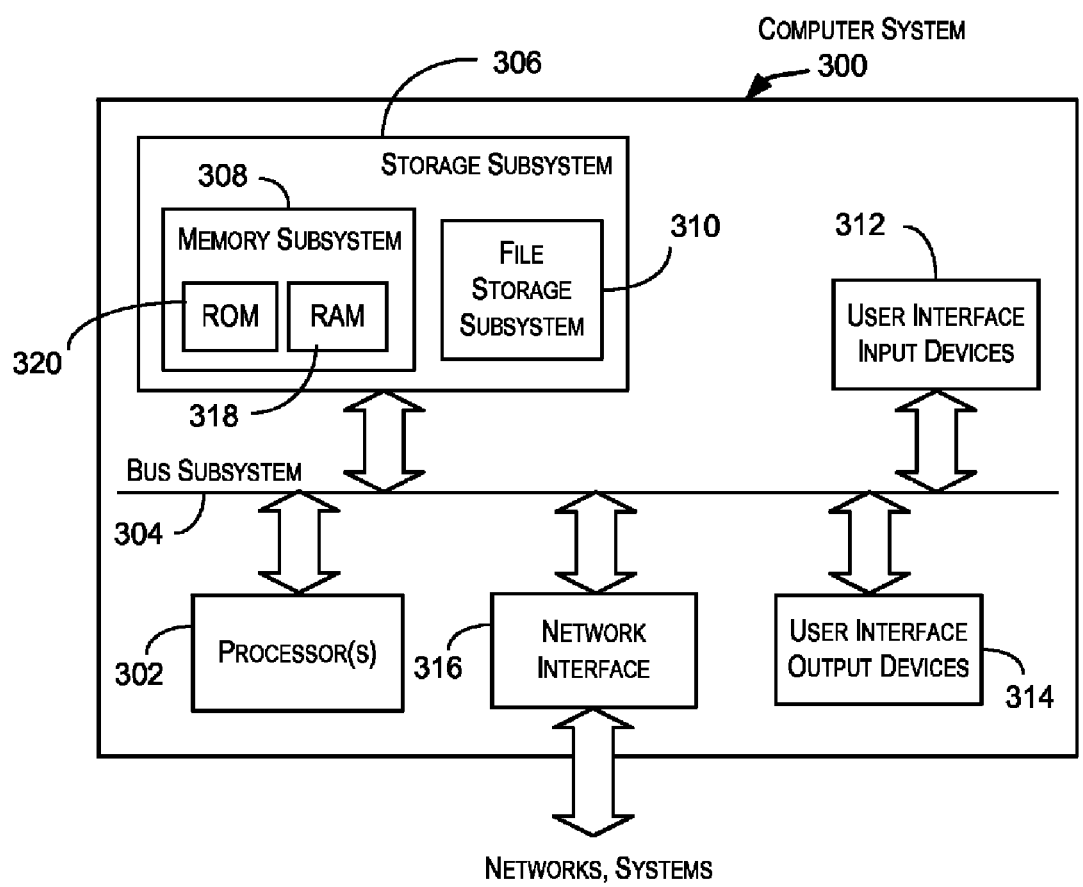
FIG. 10 is a simplified block diagram of a computer system that may be used to practice an embodiment of the present invention.

FIG. 10 is a simplified block diagram of a computer system 300 that may be used to practice an embodiment of the present invention. Computer system 300 may serve as processing system 102 depicted in FIG. 1. As shown in FIG. 10, computer system 300 includes a processor 302 that communicates with a number of peripheral subsystems via a bus subsystem 304. These peripheral subsystems may include a storage subsystem 306, comprising a memory subsystem 308 and a file storage subsystem 310, user interface input devices 312, user interface output devices 314, and a network interface subsystem 316.

Bus subsystem 304 provides a mechanism for letting the various components and subsystems of computer system 300 communicate with each other as intended. Although bus subsystem 304 is shown schematically as a single bus, alternative embodiments of the bus subsystem may utilize multiple busses.

Network interface subsystem 316 provides an interface to other computer systems, networks, and portals. Network interface subsystem 316 serves as an interface for receiving data from and transmitting data to other systems from computer system 300.

User interface input devices 312 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 300. A user may use an input device to enter input addresses as input to processing system 102 of FIG. 1.

User interface output devices 314 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 300.

Storage subsystem 306 provides a computer-readable storage medium for storing the basic programming and data constructs that provide the functionality of the present invention. Software (programs, code modules, instructions) that when executed by a processor provide the functionality of the present invention may be stored in storage subsystem 306. These software modules or instructions may be executed by processor(s) 302. Storage subsystem 306 may also provide a repository for storing data used in accordance with the present invention, for example, the data stored in the diagnostic data repository. For example, storage subsystem 306 provides a storage medium for persisting a set of one or more rules that are generated from compressing a set of input addresses. Storage subsystem 306 may comprise memory subsystem 308 and file/disk storage subsystem 310.

Memory subsystem 308 may include a number of memories including a main random access memory (RAM) 318 for storage of instructions and data during program execution and a read only memory (ROM) 320 in which fixed instructions are stored. File storage subsystem 310 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 300 can be of various types including a personal computer, a portable computer, a workstation, a network computer, a mainframe, a kiosk, a server or any other data processing system. Due to the ever-changing nature of computers and networks, the description of computer system 300 depicted in FIG. 10 is intended only as a specific example for purposes of illustrating the preferred embodiment of the computer system. Many other configurations having more or fewer components than the system depicted in FIG. 8 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art after reading this disclosure that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method for generating one or more network application configuration rules, comprising:
   receiving, at a processing system, a plurality of input addresses;
   generating, at the processing system, an acyclic tree having leaf nodes corresponding to the plurality of input addresses, each input address having an input address size measurable in bits and the acyclic tree comprising a binary tree with a depth of at least the input address size; and
   generating, at the processing system, based at least in part on the tree and a tolerance value, one or more rules, wherein the one or more rules reference the plurality of input addresses and zero or more additional addresses, the number of the additional addresses referenced being controlled based at least in part on the tolerance value, and each of the one or more rules comprises a Classless Internet Domain Routing (CIDR) expression determined based at least in part on a depth of a corresponding node in the acyclic tree.

2. The method of claim 1 wherein each of the plurality of input addresses is an Internet address.

3. The method of claim 1 wherein generating the tree comprises generating a binary tree, wherein the binary tree comprises a plurality of leaf nodes with each leaf node corresponding to one of the input addresses.

4. The method of claim 3 wherein the leaf nodes taken from left-to-right order include a sorted list of the input addresses.

5. The method of claim 1 wherein the set of one or more rules includes one or more Classless Internet Domain Routing (CIDR) expressions.

6. The method of claim 1 wherein the set of one or more rules identifies one or more address segments, wherein the one or more address segments include the input addresses and include zero or more additional addresses.

7. The method of claim 1 wherein the tolerance value is a percentage value representing a percentage of additional addresses that can be included in the set of one or more rules.

8. The method of claim 1 wherein the tolerance value is a constant value representing an allowed number of over-covered addresses.

9. The method of claim 1 wherein the tolerance value is user configurable.

10. The method of claim 1 wherein the number of the one or more rules generated is less than or equal to the number of the input addresses.

11. The method of claim 1 wherein the one or more rules at least partially configure a network application.

12. The method of claim 1 wherein the tree comprises a binary tree with a depth of at least a specified minimum depth.

13. The method of claim 1 wherein the tree comprises a binary tree with a depth of at most a specified maximum depth.

14. The method of claim 1 wherein each of the one or more rules corresponds to a node of the tree.

15. The method of claim 1 further comprising receiving network traffic associated with a source address and determining that the source address is associated with the plurality of input addresses based at least in part on the one or more rules.

16. The method of claim 15 wherein the source address is not one of the plurality of input addresses.

17. A non-transitory computer-readable storage medium storing a plurality of instructions that, when executed, cause one or more computers to collectively, at least:
   receive a plurality of input addresses;
   generate an acyclic tree having leaf nodes corresponding to the plurality of input addresses, each input address having an input address size measurable in bits and the acyclic tree comprising a binary tree with a depth of at least the input address size; and
   generate, based at least in part upon the generated tree and a tolerance value, one or more rules, wherein the one or more rules reference the plurality of input addresses and zero or more additional addresses, the number of additional addresses referenced being controlled based at least in part on the tolerance value, and each of the one or more rules comprises a Classless Internet Domain Routing (CIDR) expression determined based at least in part on a depth of a corresponding node in the acyclic tree.

18. The computer-readable storage medium of claim 17 wherein the tree comprises a binary tree having a plurality of leaf nodes and a plurality of intermediate nodes with each leaf node corresponding to one of the input addresses.

19. The computer-readable storage medium of claim 18 wherein the leaf nodes taken from left-to-right order include a sorted list of the input addresses.

20. A system for generating one or more network application configuration rules, the system comprising:
   a memory configured at least to store a plurality of input addresses; and
   a processor communicatively coupled to the memory, wherein the processor is configured to facilitate, at least:
   receiving a plurality of input addresses;
   generating an acyclic tree having leaf nodes corresponding to the plurality of input addresses, each input address having an input address size measurable in bits and the acyclic tree comprising a binary tree with a depth of at least the input address size; and
   generating, based at least in part upon the tree and a tolerance value, one or more rules, wherein the one or more rules reference the plurality of input addresses and zero or more additional addresses, the number of the additional addresses referenced being controlled based at least in part on the tolerance value, and each of the one or more rules comprises a Classless Internet Domain Routing (CIDR) expression determined based at least in part on a depth of a corresponding node in the acyclic tree.

21. The system of claim 20 wherein the set of one or more rules reference one or more address segments, wherein the one or more address segments include the input addresses and include zero or more additional addresses.

* * * * *